United States Patent Office 3,187,262
Patented June 1, 1965

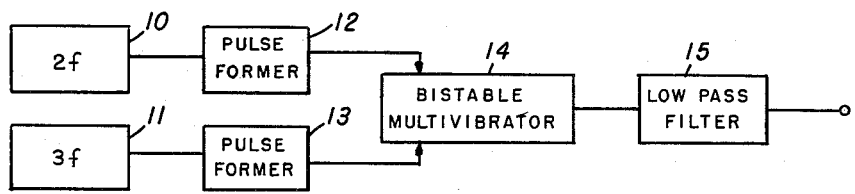
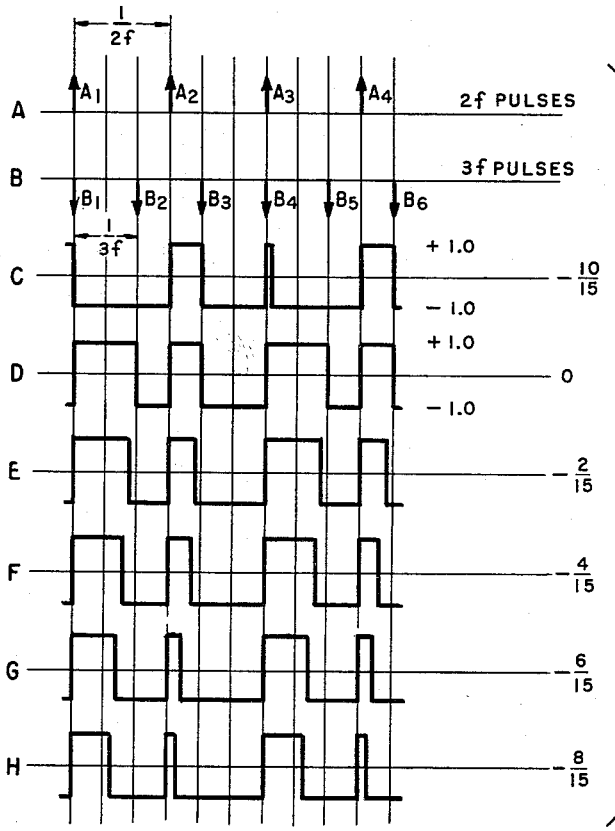
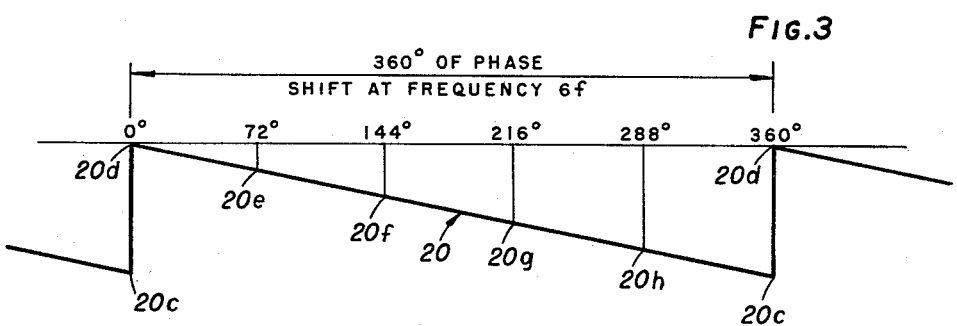

3,187,262
DETECTOR OF PHASE DIFFERENCES BETWEEN CURRENTS OF DIFFERENT FREQUENCIES
Lawrence S. Crane, Los Angeles, Calif., assignor to The Bendix Corporation, North Hollywood, Calif., a corporation of Delaware
Filed Oct. 1, 1962, Ser. No. 227,154
5 Claims. (Cl. 328—133)

This invention relates to phase detectors, and more specifically to the detection of phase differences between alternating current waves of different but harmonically related frequencies.

An object of the invention is to determine phase relations between alternating current waves of different but harmonically related frequencies without first converting them to a common frequency.

There are situations in which phase changes between alternating current waves of different frequencies must be measured or indicated. Heretofore it has been thought necessary to shift the frequency of one or both of the waves to bring them to the same frequency before phase comparison could be made. Thus, in certain radio navigation systems, an air or water craft locates its position by receiving and phase-comparing radio signals transmitted simultaneously from a plurality of known, fixed transmitting points. In order to separately receive the signals, they must be transmitted on different frequencies and separated by filters at the receiver, but after such separation it has been considered necessary to convert them to a common frequency before phase comparison could be made. The common frequency selected is usually the least common multiple of the signal frequencies. Thus, U.S. Patent No. 2,598,290 describes a system in which three signals are transmitted from different locations at frequencies of 60, 80 and 90 kc., respectively. At the receiving point the 60- and 80-kc. waves are frequency-multiplied by 4 and 3, respectively, to the common frequency 240 kc. for phase comparison, and the 60- and 90-kc. waves are frequency-multiplied by 3 and 2, respectively, to the common frequency 180 kc. for phase comparison.

In accordance with the present invention I have discovered that two waves of harmonically related frequencies can be phase-compared without prior conversion to a common frequency by causing one of the waves to trip a relay from a first to a second position at a fixed point in each cycle and causing the other wave to trip the relay into the first position at a fixed point in each cycle. The relay functions to deliver an output of fixed magnitude and of one polarity in the first position, and of the same magnitude but the opposite polarity in the second position. In operation, as will be shown, with a certain relative phase relation between the waves, the relay output is positive half the time and negative half the time so that the average or integrated value is zero. As the phase changes in one direction, the integrated value increases linearly to a maximum amplitude at a phase change of 360° at the least common frequency (the frequency which is the least common multiple of the signal frequencies) and then suddenly reverts to zero value and repeats. It will also be shown that the output of the relay consists of a pattern of positive and negative rectangular pulses, which pattern repeats at a low frequency equal to the greatest common divisor of the signal frequencies. In the example referred to, the greatest common divisor of 60 and 80 is 20, and that of 60 and 90 is 30. A filter or integrating circuit in the output of the relay should eliminate substantially all frequencies above and including the greatest common divisor of the signal frequencies.

The word "relay" has been employed to cover any device that produces rectangular waves in its output. Conventional mechanical relays do this, but the upper frequency at which they can operate is limited. However, electronic relays are known which are not subject to these frequency limitations. One form of such relay that is commonly employed is a conventional multivibrator circuit of the bistable type which never vibrates continuously but moves into one condition in response to an input on one terminal and moves into the other position in response to an input potential on a second terminal.

A full understanding of the invention may be had from the following description with reference to the drawing, in which:

FIG. 1 is a schematic diagram of a system incorporating the invention.

FIG. 2 is a series of waveforms showing the wave shapes of the output of the multivibrator in FIG. 1 prior to integration.

FIG. 3 is a graph showing the linear variation of the integrated output of the multivibrator with change in phase.

FIG. 1 shows a circuit in accordance with the invention for phase-comparing two waves of frequencies $2f$ and $3f$, respectively, the wave $2f$ being considered the reference and the wave $3f$ varying in phase with respect to the wave $2f$. The waves $2f$ and $3f$ from the sources 10 and 11, respectively, are delivered to a pair of pulse formers 12 and 13, respectively, which derive from each wave at a particular point in its cycle a short pulse or spike. The spikes generated by the pulse former 12 are applied to one input of the bistable multivibrator 14 to cause it to deliver a positive output, and the spikes from the pulse former 13 are applied to the other input of the multivibrator to cause it to produce a negative output. In operation, the multivibrator 14 is stimulated to sometimes produce a positive output and sometimes produce a negative output, so that the output consists of alternate positive and negative pulses. These pulses are passed through a low-pass filter 15 which delivers a direct current representing the mean value of the positive and negative pulses in the output.

Referring to FIG. 2, Graph A represents the output of pulse former 12, consisting of sharp spikes occurring at the same point in each cycle of the current of frequency $2f$. These spikes are delivered to such a terminal of the multivibrator 14 as to cause it to produce positive pulses in its output circuit and are therefore shown as arrows pointing upwardly.

Graph B represents the output of pulse former 13, consisting of sharp spikes occurring at the same point in each cycle of the current of frequency $3f$ and are delivered to the other input terminal of the multivibrator to produce negative pulses in the output thereof and are therefore shown as arrows pointing downwardly.

Graphs C and D represent the output of the multivibrator 14 in response to the spikes of Graphs A and B when the phase relation between them is such that if both the $2f$ and $3f$ spikes were multiplied to the least common frequency of $6f$, the resultant $6f$ spikes would be substantially in phase. When such phase relation does exist, once during each cycle of the base frequency $f$ (six cycles of the frequency $6f$) a spike of Graph A will coincide with a spike of Graph B. Let it be assumed that the phase of the spikes in Graph A remains constant and that the phase of the spikes in Graph B is changing in such a way that the spikes are moving to the left. The multivibrator output is as shown in Graph C when the leftward-moving spike $B_4$ occurs just after the spike $A_3$. Under this condition the positive pulse in Graph C produced by spike A is of negligible duration, and the integrated value of the positive and negative half waves in Graph C during one cycle of the base frequency $f$ (six cycles of the least common frequency $6f$) is 1—5, or —4.

The integrated value for one cycle of the frequency $6f$ would be $$-\frac{4}{6}$$

(or $$-\frac{10}{15}$$

as shown in FIG. 3) of what the integrated value would be if the multivibrator output remained negative throughout one cycle of the base frequency $f$.

The multivibrator output represented by Graph D results when the leftward movement of the spikes in Graph B has caused the spikes $B_4$ to occur just before the spike $A_3$ so that spike $A_3$ produces a long positive pulse. This results in an integrated value of 3−3, or 0.

Graphs E to H, inclusive, show the effects of further phase changes by increments of 72°.

Referring now to FIG. 3, the graph 20 shows changes in the integrated output of the low-pass filter 15 which occur in response to changes in phase of the $3f$ wave relative to the phase of the $2f$ wave. Points on the graph 20 corresponding to the phase relations shown in Graphs C to H are identified as 20c to 20h, respectively. It will be observed that the phase change between points 20c and 20d is miniscule, yet produces a change in the output of filter 15 from 0 to $$-\frac{10}{15}$$

whereas further phase changes produce a lesser, but uniform, change. For convenience Graphs D, E, F, G, H and C show conditions with successive phase changes of 72° of each cycle of the frequency $6f$, resulting in output changes in increments of $$\frac{2}{15}$$

from 0 to $$-\frac{2}{3}\left(-\frac{10}{15}\right)$$

If the output shown in FIG. 3 is applied to a meter of the proper range calibrated in degrees and having a full scale reading of 360°, it will read directly the phase changes that occur and will snap from either end of the vertical scale to the other end when the phase change exceeds a cycle.

Although for the purpose of explaining the invention a particular embodiment thereof has been shown and described, obvious modifications will occur to a person skilled in the art, and I do not desire to be limited to the exact details shown and described.

I claim:

1. Apparatus for determining phase changes of a first alternating current wave of frequency $f_1$ with respect to a second alternating current wave of frequency $f_2$ in which $f_1$ and $f_2$ are different harmonics of a base frequency $f_b$ constituting the greatest common divisor of $f_1$ and $f_2$, said apparatus comprising:

first pulse-forming means responsive to said first wave for generating a first train of pulses synchronized in fixed phase relation with said first wave;

second pulse-forming means responsive to said second wave for generating a second train of pulses synchronized in fixed phase relation with said second wave;

the pulses of said first and second trains being sharp spikes shorter than the half wavelength of either of said waves;

bistable means connected to said first and second pulse-forming means and operable into a first condition in response to each pulse of said first train and into a second condition in response to each pulse of said second train, said bistable means generating outputs of equal magnitudes but of opposite polarities in said first and second conditions respectively;

filter means connected to said bistable means for integrating the output thereof over a time at least equal to the period of said base frequency, the magnitude of the D.C. output of said filter means varying linearly with phase change between said first and second alternating waves over the period of the cycle of the least common frequency of $f_1$ and $f_2$.

2. Apparatus for deriving a voltage proportional to the time or phase relationship of a pair of input waves of different frequencies, $n_1f$ and $n_2f$, comprising:

means responsive to the first wave, $n_1f$, for generating a pulse time-related to a selected portion of each cycle of said first wave;

means responsive to the second wave, $n_2f$, for generating a pulse time-related to a selected portion of each cycle of said second wave;

the pulses from both of said generating means being sharp spikes of length a short fraction of the half wavelength of either of said input waves;

bistable switch means producing either of two discrete voltage levels in response to input pulses applied to either of two input terminals thereof;

means applying the outputs of said first and second pulse-generating means to the respective input terminals of said bistable switch means;

and means for deriving the average output voltage level of said bistable switch means, the magnitude of said average output voltage being a function of the time or phase relationship of the pair of waves, $n_1f$ and $n_2f$.

3. Apparatus in accordance with claim 2 wherein said average output voltage-deriving means is operative to derive the average voltage level over a period of at least the period of the greatest common divisor frequency of said first and second waves, $n_1f$ and $n_2f$.

4. The combination in accordance with claim 3 wherein said average output voltage-deriving means comprises a low-pass filter.

5. Apparatus in accordance with claim 2 wherein said switch means comprises a bistable multivibrator.

References Cited by the Examiner

UNITED STATES PATENTS 3,058,063   10/62   Sher _____ 328—134

FOREIGN PATENTS 765,685   1/57   Great Britain.

ARTHUR GAUSS, *Primary Examiner.*